Patented May 8, 1934

1,958,372

UNITED STATES PATENT OFFICE 1,958,372

POLYMERIZED AND OXIDIZED OILS AND PROCESSES OF PREPARING

Alexander Schwarcman, Buffalo, N. Y., assignor to Spencer Kellogg and Sons, Inc., Buffalo, N. Y., a corporation of New York No Drawing. Application March 16, 1932, Serial No. 599,368

3 Claims. (Cl. 87—12)

This invention relates to polymerized and oxidized oils and processes of preparing; and it comprises as a new oily material a non-yellowing polymerized linseed oil, oxidized subsequent to polymerization and miscible with pyroxylin compositions, said oil often containing an admixture of oxidized castor oil; and it also comprises a process of preparing such an oil wherein linseed oil is exposed to heat in the neighborhood of 600° F. for a substantial period until a substantial polymerization and reduction in the iodin number occurs; is thereafter cooled down to a lower temperature, ordinarily in the range between 200° and 300° F., and is then air blown using ordinary air; the air blowing being often conducted in the presence of admixed castor oil, although sometimes castor oil is separately oxidized and the oxidized castor oil added to the oxidized linseed oil; all as more fully hereinafter set forth and as claimed.

Linseed oil is the most widely used coating material but its chemistry is still obscure; its manufacture, refining and use are largely empirical. The conversion of liquid linseed oil in paint and varnish into a solid film, on exposure to air, is usually regarded as due to oxidation; to the formation of "linoxyn"; and oxidation is no doubt one factor. But there are various other concurrent reactions in "drying" linseed oil; gelation, polymerization, condensation, hydrolysis, molecular and colloidal rearrangements, etc., going on at varying velocities up to the time most internal changes are arrested by solidification. There are many known methods of treatment of linseed oil preliminary to its use in paint and varnish; these mostly resulting in specific products useful in special relations.

In this invention, new and useful oils derived from linseed oil are made by air blowing; the material blown being a cooled-down, heat-treated polymerized oil having a reduced iodin number.

Linseed oil contains linoleic acid and other acid bodes more unsaturated than the oleic acid and olein of the ordinary vegetable and animal oils. It is to the existence of these unsaturated contained bodies that linseed oil largely owes its characteristic properties; the properties which render it valuable in the arts. The iodin number is an index of unsaturation; the greater the iodin number, the higher is the degree of unsaturation; and the oxidizability corresponds, more or less closely, with the iodin number, in the sense that the greater the iodin number, the more oxygen the oil is able to take up. Not only are the unsaturated groups responsible for the oxidizability of linseed oil, but for many other internal changes which take place in the treatment and use of linseed oil; polymerization, gelation, molecular rearrangement, etc.

For many years, it has been usual to treat linseed oil intended for some purposes by heating in a kettle to various high temperatures. Sometimes, air has free access to the contents of the kettle and sometimes, not; this being a matter of the design of the kettle. Of late years, it has been customary to heat the oil in such a manner as to prevent access of air to any substantial degree. Sometimes, closed apparatus is used and sometimes, open apparatus; the latter being of such design that the evolved gases and vapors push away the air. Oil heated in this way, where the temperature reaches 500—600° F., is known as polymerized oil or, "stand oil". "Polymerization" is not used in its strictly chemical sense.

During polymerization, a complex series of internal reactions ensues; these being not well understood and probably including not only strictly chemical changes, but changes in colloidal relations. Polymerization, in the chemical sense, is undoubtedly only one of the reactions taking place. There is always a drop in the iodin number and an increase in viscosity; these two, however, not being simultaneous. Access of any air during polymerization changes the results; gives a different product.

"Polymerized" oil acquires a number of properties rendering it valuable. It can be reheated to any temperature, even up to 600° F., without darkening and without foaming, and the hot oil can be blended with gum resins at a like temperature to make pale coating compositions. Varnish films made with polymerized oil dry with high gloss, with a minimum after-yellowing effect, and have a high tensile strength.

Linseed oil is treated in other ways for other purposes than those for which polymerized oil is made. One of these ways of treatment is air blowing and this is usually done at temperatures below 300° F. Air blowing at the polymerization temperature, around 600° F., is not practical. Air blown oils, which may be here called oxidized oils, can be produced having the same consistency or thickness as polymerized oils, but the two products are different, chemically and physically. For example, the polymerized oils can be heated to any temperature up to 600° F. without darkening, while oxidized oils when heated to any high temperature foam very badly and turn deep red. Gum resins cannot be incorporated into oxidized oils by which temperature operations as they can be in polymerized oils. Polymerized oils will dry with a high gloss and will show a minimum after-yellowing effect; oxidized oils are first glossy but, in a short time, they turn flat and a yellowing effect sets in. The tensile strength of films of polymerized oil is very high; of blown oil, very low. The two oils of the same consistency will show different viscosities and iodin values. Oxidized oils are miscible with pyroxylin compositions, while polymerized oils are not. Polymerized oils are miscible with mineral oils in all proportions, while oxidized oils are relatively insoluble in mineral oils.

I have found that an oil combining some of the properties of polymerized oil with some of those of oxidized oil is useful in certain relations. In producing such an oil, I use what may be called a combined treatment; first polymerizing an oil at a temperature between 550° and 620° F. to a certain extent and then air blowing the oil at a temperature between 200° and 300° F. In practicing the present process, oil is polymerized, the hot oil is cooled to 300° F. or below and is air blown. It is advantageous to air blow with decreasing temperature; beginning at, say, 270° F. and finishing at, say, 200° F. The bodying due to polymerization and that due to the air blowing, taken together, give the total increase of body wanted.

The order of steps stated is important, since it is oxidation of polymerized oil, and not polymerization of oxidized oil, that is wanted.

In the present process, polymerization of linseed oil is effected by heating for 6 or 8 hours at a temperature of the order of 600° F., cooling down below 300° F. and then air blowing. The new product obtained has been found to have some of the properties of polymerized oils and some of those oxidized oils. The new product is miscible with pyroxylin solutions and can be heated to high temperatures, such as those used in making blended products with copals, without foaming or darkening. It can therefore be used in making pale lacquers and varnishes with the aid of gums. Varnish films produced with the new oil have a high tensile strength. The miscibility of the new oil with mineral oils is sufficient for all practical purposes. Paints and varnishes made with the new oil do not yellow in the dark and dry with a high enamel-like gloss. Varnish compositions containing the new oil and mixed with white pigments can be baked at 200° F. without development of yellow hues.

The new oil can be used for many purposes in the arts; but it is particularly valuable in pyroxylin lacquers. In this connection it may be used together with oxidized castor oil. Oxidized castor oil is often added to these lacquers, but the amount which can be added is necessarily limited, because of its non-drying properties. If used in large proportions, it produces soft, non-adherent films.

In practicing the present invention, I first eliminate the "break" and color of raw linseed oil in usual ways and then heat at from 550° to 600° F., until a heavy body is obtained. Contact with air during this heating is not desired, but heating in properly designed open kettles produces a satisfactory product. No substantial oxidation should take place during this first heating. With an oil having an iodin value of about 180, this heating is usually carried on long enough to drop the iodin value to about 130. After internal changes are carried to the stage desired, the oil is cooled down quickly to about 270° F. It is then blown with ordinary air at this temperature for about 3 hours and the temperature is then lowered to about 200° F. Blowing is continued at the latter temperature until a substantial amount of oxidation is obtained, the particular degree of oxidation sought depending upon the particular "body" to be produced. Good results are obtained where the iodin value, with an oil having 130 after the first heat treatment, is dropped in oxidation to between 80 and 90.

Where a blown oil is required particularly adapted for admixture with pyroxylin solutions, it is an advantage to have some oxidized castor oil present. Where such a preparation is to be made, castor oil may be admixed with the cooled-down oil coming from the heat treatment and the mixture air blown. In making a mixture, I often use 7 parts of linseed oil to 3 parts of castor oil. The two oils may be blown separately and then mixed; but it is ordinarily easier to add castor oil to the heat treated linseed oil and blow the two together. The castor oil may be heated and added to the cooled-down linseed oil or it may be added cold to assist in the cooling of the linseed oil. As before, blowing may be carried on for about 3 hours at 270° F. and then at a lower temperature, say 200° F., until the desired degree of body is obtained. It is not necessary to carry out the air blowing in two steps, but some time is saved by so doing. A temperature of 200° F. may be maintained throughout the air blowing. The same final iodin number is suitable here, between 80 and 90.

The composite oil containing air blown castor oil as well as air blown, polymerized linseed oil, is particularly valuable for admixture with compositions containing pyroxylin. With pyroxylin lacquers, it yields a highly glossy finish which cannot be attained otherwise. Its adhesive properties, and those of pyroxylin compositions containing it, to underlying surfaces are good. Pyroxylin varnishes and lacquers do not usually give a good adhesion to metal surfaces. The composite oil of the present invention adheres well to metal.

The amount of castor oil added can vary. Good results are obtained with 10, with 20 and with 30 per cent. On the whole, probably 30 per cent castor oil is best.

The composite oil containing castor oil is better not only for use with pyroxylin, but for many other purposes; better than either oil separately. Varnish films formed from the composite oil have a good gloss and, for some unexplained reason, the composite oil has even less tendency to yellow than the polymerized, oxidized linseed oil used alone. White pigment ground in the composite oil and baked at temperatures of 300° F. shows absolutely no after-yellowing effects; something which is hardly true of any other comparable varnish oils. Above all, however, pigment pastes obtained with the composite oil remain soft indefinitely. Many pigment pastes prepared with other oils have a tendency to skin on the surface quickly and unless the paste is soon used, serious trouble may result, tiny particles of dry film entering into the lacquer from which they cannot be eliminated. The composite oil of the present invention approaches the ideal for an all around oil to be added to pyroxylin lacquers.

What I claim is:—

1. In the manufacture of linseed oil preparations and useful in paints and varnishes, the process which comprises heating linseed oil having an iodin value of approximately 180 at a temperature between 550° and 620° F. without substantial oxidation, until a heavy body is obtained and the iodin value drops to approximately 130, quickly cooling the bodied oil to about 270° F., air blowing the bodied oil at that temperature with ordinary air, lowering the temperature to about 200° F. and continuing the air blowing until the iodin value drops to between 80 and 90, thus producing a heat-bodied, air blown oil miscible with pyroxylin compositions and suitable both as a component in oil varnishes and in pyroxylin compositions.

2. As an improvement in the manufacture of bodied linseed oil preparations useful in paints and varnishes, the improvement which comprises heating linseed oil to temperatures between 550° and 620° F. without substantial oxidation until a thickened heat-bodied oil having an iodine value of approximately 130 is obtained, and then oxidizing the heat-bodied oil thus obtained by passing a current of air through the heat-bodied oil maintained at temperatures between 300° and 200° F. until an oxidized, heat-bodied oil having an iodine value between 80 and 90 is obtained and recovering the oxidized, heat-bodied oil preparation so produced.

3. The process of claim 1 wherein 10 to 30 per cent of castor oil is added to said thickened, heat-bodied, linseed oil prior to said air-blowing, the addition of castor oil improving the properties of the composite oil products obtainable by the subsequent air-blowing of the mixture.

ALEXANDER SCHWARCMAN.